United States Patent
Barber et al.

(10) Patent No.: US 9,850,969 B2
(45) Date of Patent: *Dec. 26, 2017

(54) MULTI-PLANE BRAKE ROTOR HAT HOLES AND METHOD OF MAKING THE SAME

(71) Applicant: AKEBONO BRAKE INDUSTRY CO., LTD, Chuo-ku, Tokyo (JP)

(72) Inventors: Eric J. Barber, South Lyon, MI (US); Brian C. Nadeau, Chelsea, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 25 days.

This patent is subject to a terminal disclaimer.

(21) Appl. No.: 14/734,593

(22) Filed: Jun. 9, 2015

(65) Prior Publication Data

US 2015/0267766 A1  Sep. 24, 2015

Related U.S. Application Data (63) Continuation of application No. 13/629,883, filed on Sep. 28, 2012, now Pat. No. 9,079,241.

(60) Provisional application No. 61/656,711, filed on Jun. 7, 2012.

(51) Int. Cl.
| | |
|---|---|
| *B22C 9/00* | (2006.01) |
| *B22C 9/02* | (2006.01) |
| *B22C 9/10* | (2006.01) |
| *F16D 65/12* | (2006.01) |
| *F16D 65/02* | (2006.01) |

(52) U.S. Cl.
CPC ............. *F16D 65/128* (2013.01); *B22C 9/00* (2013.01); *B22C 9/02* (2013.01); *B22C 9/10* (2013.01); *F16D 2065/1308* (2013.01); *F16D 2065/1328* (2013.01); *F16D 2065/1344* (2013.01)

(58) Field of Classification Search
CPC .... B22C 9/00; B22C 9/02; B22C 9/10; B22C 9/108
USPC ...................................... 164/28, 30
See application file for complete search history.

(56) References Cited

U.S. PATENT DOCUMENTS

| | | |
|---|---|---|
| 2,380,085 A | 7/1945 | Tack |
| 4,733,712 A | 3/1988 | Koppenhofer |
| 4,757,883 A | 7/1988 | Thiel et al. |

(Continued)

FOREIGN PATENT DOCUMENTS

| | | |
|---|---|---|
| DE | 3924849 | 7/1991 |
| WO | 2009129231 | 10/2009 |

OTHER PUBLICATIONS

Photograph of Disc Brake Rotor: Front Disc Brake Rotor pamphlet of brake rotor for 2009-2011 Toyota Venza, product SKU BA083-3423, last accessed Aug. 21, 2013, at www.automotivepart.com.

*Primary Examiner* — Kevin P Kerns
(74) *Attorney, Agent, or Firm* — The Dobrusin Law Firm, P.C.

(57) ABSTRACT

A method of forming a rotor by forming a mold by forming a first mold cake, a second mold cake, and a core that fits between the first and the second mold cake. The method includes a step of locating the core between the first mold cake and the second mold cake. The core includes a body, one or more projections extending from the body for forming one or more holes in a base portion of the rotor, and one or more projections extending from the body for forming one or more holes in a bat wall of the rotor.

20 Claims, 7 Drawing Sheets

(56) References Cited

U.S. PATENT DOCUMENTS

| | | | |
|---|---|---|---|
| 5,503,214 A * | 4/1996 | Cribley et al. | B22C 9/10 |
| | | | 164/134 |
| 5,915,747 A | 6/1999 | Dickerson et al. | |
| 6,216,828 B1 | 4/2001 | Burger | |
| 6,637,497 B2 | 10/2003 | Herron | |
| 7,066,306 B2 | 6/2006 | Gavin | |
| 7,806,161 B2 | 10/2010 | Jezwinski | |
| 8,210,232 B2 * | 7/2012 | Xia | B22D 19/00 |
| | | | 164/111 |
| 9,079,241 B2 * | 7/2015 | Barber et al. | B22C 9/02 |
| 2007/0181390 A1 | 8/2007 | Korm | |

* cited by examiner

MULTI-PLANE BRAKE ROTOR HAT HOLES AND METHOD OF MAKING THE SAME

CROSS REFERENCE TO RELATED APPLICATIONS

This application is a continuation of U.S. patent application Ser. No. 13/629,883 filed on Sep. 28, 2012, which issued as U.S. Pat. No. 9,079,241 on Jul. 14, 2015, and which claims priority to U.S. Provisional Application No. 61/656,711 filed on Jun. 2, 2012, all of which are hereby incorporated by reference.

FIELD

The present teachings generally relate to method of producing a component and specifically a method of producing a brake rotor that includes holes in multiple planes for improved cooling.

BACKGROUND

The present teachings are predicated upon providing an improved brake rotor with increased cooling and a reduced unsprung mass. For example, the rotor may be used with almost any vehicle (e.g. car, truck, bus, train, airplane, or the like). Alternatively, the rotor may be integrated into assemblies used for manufacturing or other equipment that require a brake such as a lathe, wind turbine, winder for paper products or cloth, amusement park rides, or the like. However, the present teachings are most suitable for use with a vehicle (i.e. a car, truck, sports utility vehicle, or the like).

Generally, a braking system includes a rotor, a caliper body, a support bracket, an inboard brake pad, and an outboard brake pad that are on opposing sides of the rotor. The caliper body includes a bridge, one or more fingers, and a piston bore. Typically, braking systems include one or more pin bores on the caliper body, brake pads, and support bracket for receiving a pin that secures the caliper and the brake pads on the support bracket so that the brake pads can slide on the pins to create a braking force. The brake pads are moved by a piston located in the piston bore. The piston bore further includes a fluid inlet in a closed wall, a front opening, and a cylindrical side wall that includes a seal groove located near the front opening. The brake fluid enters the closed wall of the piston bore during a pressure apply and moves the piston towards the front opening into contact with a brake pad. The brake pad slides towards the rotor and simultaneously or slightly thereafter the one or more fingers push the opposing brake pad towards and into contact the opposing side of the rotor. The contact between the inboard brake pad, the outboard brake pad, and the rotor create a friction force that reduces the rotational speed of the rotor, thus, slowing and/or stopping the article attached to the braking system. The friction force between the brake pads and the rotor during normal braking operation causes the brake pads, the rotor, or both, to become heated. During extended braking and/or high intensity braking the brake pads, the rotor, or both may become excessively heated. This heat, if not dissipated may heat the brake fluid; damage (e.g., crack, warp, or both) the brake pads, the rotor, or both; cause the brake system to have a reduced braking capacity or even fail so that the braking system does not adequately brake; or a combination thereof.

Additionally, the creation of unitary rotors with improved heat dissipation has been limited due to manufacturing constraints and concern that some methods for providing for dissipation of heat may negatively impact the structural strength of the rotor. Venting locations and configurations have generally been limited to a single plane. Examples of some rotors and attempts to dissipate heat of rotors and/or brake pads may be found in U.S. Pat. Nos. 4,757,883; 5,915,747; 6,216,828; and 7,066,306 U.S. Patent Application Publication No. 2007/0181390; International Patent Application No. WO2009129231; and German Patent No. DE3924849 all of which are incorporated by reference herein for all purposes.

It would be attractive to have a vented rotor that has an increased heat dissipation capacity while maintaining structural integrity and resistance to failure. It would further be attractive to have a rotor that dissipates heat quickly so that heat is not transferred from the brake pads and/or rotor into the brake fluid. What is needed is a rotor with a reduced unsprung mass, when compared to standard rotors, which has increased cooling capabilities. What is further needed is a method of manufacturing an improved rotor that includes the improved heat dissipation structures as described herein while maintaining the necessary strength of the rotor.

SUMMARY

The teachings herein meet one or more of the present needs by providing an improved rotor with increased cooling. The improved rotor includes cooling on multiple planes so that air flow through the base portion and the hat portion is increased and the rotor dissipates heat so that the heat is not transferred to the brake fluid. The teachings, furthermore, provide a method of producing a unitary rotor with holes located on multiple planes so that the rotor has increased cooling as discussed herein.

One possible embodiment of the present teachings include: a rotor comprising: a two sided braking surface, a base portion; a hat portion connected to the two sided braking surface via the base portion, the hat portion including: a mounting face and a hat wall; and wherein the base portion includes holes and the hat wall includes holes.

One possible embodiment of the present teachings include: a method of forming the rotor taught herein comprising: forming a mold that includes a core having one or more projections for forming the holes in the base portion and one or more projections for forming the holes in the hat wall.

The teachings herein surprisingly solve one or more of these problems by providing a vented rotor that has an increased heat dissipation capacity while maintaining structural integrity and resistance to failure. The teachings herein further provide a rotor that dissipates heat quickly so that heat is not transferred from the brake pads and/or rotor into the brake fluid. The rotor discussed herein is a rotor with a reduced unsprung mass, when compared to standard rotors, and has increased cooling. The teachings herein also include a method of manufacturing an improved rotor that includes the improved heat dissipation structures as described herein.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description. The present teachings claim the benefit of the priority of the filing date of U.S. Provisional Application Ser. No. 61/656,711, filed Jun. 7, 2012, which is herein incorporated by reference for all purposes.

The present teachings herein relate to an improved rotor for use in a disc brake system. Preferably, the disc brake system is a dry brake system. For example, the disc brake system may be free of any added cooling medium that surrounds the frictions surfaces such as heat transfer liquid (e.g., oil). In another example, the rotor may not have any liquid, additional material, or both circulated around the rotor, the brake pads, or both to cool the friction materials other than air. The rotor as discussed herein may include an outer diameter, and the outer diameter may be any size so that the rotor may include one or more holes in the hat wall, the base portion, or both. The rotor as discussed herein may include an outer diameter of about 300 mm or more, preferably about 325 mm or more, or more preferably about 350 mm or more. The rotor may have an outer diameter of between about 280 mm and 450 mm, preferably between about 300 mm and 410 mm, and more preferably between about 320 mm to about 390 mm. The rotor includes a two sided braking surface, a hat portion, and a base portion connecting the two sided braking surface to the hat portion. The rotor may be comprised of multiple pieces that are joined together (e.g., welded, bolted, mechanically bonded, fastened, or a combination thereof). Preferably, the rotor (i.e., two sided braking surface, base portion, and hat portion) is one unitary piece. For example, the two sided braking surface and the hat portion may be free of attachment using fasteners (i.e., bolts).

The two sided braking surface may be any surface that may be used to create friction. The two sided braking surface may be circumferential. Preferably, the two sided braking surface is circumferential in shape and rotates during use so that when contacted on both sides by opposing braking surfaces the rotation of the rotor is slowed so that any adjoining component is slowed, stopped, or both. More preferably, the two sided braking surface is attached to a vehicle and located between two brake pads so that during braking the brake pads are moved into contact with each side of the braking surface slowing and/or stopping the vehicle. The two sided braking surface may be a solid piece of material. The two sided braking surface may be an integral piece with two faces and/or two unitary opposing brake surfaces that are joined together. The two sided braking surface is comprised of an inboard brake plate and an outboard brake plate. The inboard bake plate being contacted by an inboard brake pad and the outboard brake plate being contacted by an outboard brake pad during a brake apply. The inboard brake plate and the outboard brake plate may be separated by a venting portion. Preferably, the two sided braking surface is separated by a venting portion so that air flows between the two unitary opposing brake surfaces. For example, the rotor may be a vented rotor. The venting portion may include one or more ribs that separate the two braking surfaces and allow for air to pass between the braking surfaces. The one or more ribs may be any shape, size, configuration, or a combination thereof so that the two opposing braking surfaces are joined and pressure may be applied to the braking surfaces creating a braking force. The one or more ribs may be attached between the two brake surfaces. Preferably, the one or more ribs and the two brake surfaces are one unitary piece. The two sided braking surface may be connected to the rotor by a base portion. Preferably, the inboard brake plate and the outboard brake plate are attached to a hat portion via the base portion.

The base portion may be any part of the rotor that connects the braking surface to the hat portion. The base portion is substantially located in a base plane. Preferably, a majority (i.e., 90 percent or more, 95 percent or more, or even 99 percent or more) of the base portion is located in the base plane. The base portion may have any configuration so that the base portion attaches the hat portion to the braking surface. The base portion may be of any style so that the base portion attaches the two sided braking surface to the hat portion, provides a surface that cools the rotor, or both. The base portion may have a large radius, a small radius, a straight section, or a combination thereof. The radius type may affect the size of the hat wall for a rotor and the size of the hole in the rotor. For example, a large base portion may reduce the packing space available for the hat wall and may result in a smaller hat wall, and the size of the holes may be reduced so that the holes fit within the space available in the hat wall. In another example, a large base portion may result in a larger hat wall and larger holes do to more space being available. The base portion has a length. The length of the base portion may be circumferential. The length of the base portion may be between about 50 cm and about 200 cm, between about 60 cm and about 175 cm, or between about 75 cm and about 150 cm. The length of the base portion may vary from rotor application to rotor application. For example, a compact car may have an annular length of about 80 cm and a truck may have an annular length of about 105 cm. The base portion includes a height (i.e., the distance between the hat portion and the two sided braking surface). The height of the base portion may be any height so that the base portion connects the braking surface to the hat portion. Preferably, the base portion may have a sufficient height so that the base portion may include one or more holes. The holes may be of any size, shape, configuration, pattern, spacing, or a combination thereof as discussed herein. The holes may be located in the base portion in any configuration so that a resulting connection region between the hat portion and the braking surface, base portion itself, a connection region between the base portion and the two sided braking surface, or a combination thereof are sufficiently strong so that the rotor can withstand an emergency braking force, a high torque load as discussed herein, enhance cooling, or a combination thereof without failure. The base portion is attached to the hat portion so that the rotor may be attached to an adjoining component via the hat portion.

The hat portion of the rotor may be of any size and shape so that the hat portion connects the rotor to an adjoining assembly. The hat portion may include a mounting face and a hat wall. The mounting face may include holes. The holes may be of any size and shape so that the mounting face may be used to connect the rotor to an adjoining assembly. Preferably, the holes may be sized so that the mounting face may attach the rotor to a wheel hub of an automobile. The hat wall may attach to the mounting face on one side and extend into contact with a base portion on an opposing side. The hat wall may extend at any angle between the mounting face and the base portion so that the mounting face is attached to the base portion. The hat wall may be substantially located in a plane. Preferably, a majority (i.e., 90 percent or more, 95 percent or more, or even 99 percent or more) of the hat wall is located in a hat plane. More preferably, the hat wall plane is cylindrical in shape. For example, a cross-section of the cylindrical plane forms a circle. The hat wall may be substantially perpendicular to the mounting face, the base portion, or both. The hat wall may form an angle that is about ±1 degree or more, about ±3 degrees or more, or about ±5 degrees from perpendicular with the mounting face, the base portion, or both. The hat wall may include an arcuate connection region with the mounting face, the base portion, or both. For example, the connection region may have a radius where the hat wall connects to the mounting, face, the base portion, or both. The hat wall has a length. The length of the hat wall may be circumferential (i.e., the length of the hat wall as discussed herein is the circumference of the hat wall). The length of the hat wall may be between about 50 cm and about 200 cm, between about 60 cm and about 175 cm, or between about 75 cm and about 150 cm. The length of the hat wall may vary from application to application. For example, the annular length in a compact car may be about 48 cm and the annular length in a truck may be about 65 cm. The hat wall includes a height (i.e., the distance between the mounting face and the base portion). The height of the hat wall may be any height so that the hat wall connects the mounting face to the base portion. Preferably, the hat well may have a sufficient height so that the hat wall may include one or more holes. The holes may be of any size, shape, configuration, pattern, spacing, or a combination thereof as discussed herein. The holes may be located in the hat wall so that a connection region between the hat wall, the mounting face, and the base portion is sufficiently strong so that the rotor can withstand an emergency braking force, a high torque load as discussed herein, or both without failure.

The hat wall, the base portion, or both include one or more holes. The holes may be located at any location along the height, the length, or both of the hat wall, the base portion, or both. The holes may be located, shaped, oriented, or a combination thereof so that turbulent air flow may be created around the hat wall, the base portion, or both. The holes may be located, shaped, oriented, or a combination so that air flows through and/or around the hat wall, the base portion, or both. The holes may be located, shaped, oriented, or a combination so that the rotor is convectively cooled, forced convectively cooled, or both so that heat is not conducted, radiated, or both to the adjacent brake components and specifically the brake fluid. The holes may be oriented in the hat wall, the base portion, or both so that the holes direct air through the hat wall, the base portion, or both to create an increase in cooling. Each hole has a hole wall. For example, the hole wall is the internal wall of a surface through which a hole extends. Stated another way, the hole wall extends though the thickness of the hat wall, the base portion or both and the hole wall may be formed at an angle relative to the outer surfaces or a respective wall. The holes may be oriented so that the hole wall extends at a right angle with a top surface, a bottom surface, or both of the hat wall, the base portion, or both. The holes may be oriented so that the hole wall forms an angle of between about 30 degrees and 90 degrees, preferably between about 45 degrees and 90 degrees, more preferably about 60 degrees and 90 degrees, or most preferably between about 75 degrees and 90 degrees with the top surface, the bottom surface, or both of the hat wall, the base portion, or both.

Preferably, the hat wall, the base portion, or both include a plurality of holes. The quantity of holes included in the hat wall, the base portion, or both may be any quantity so that the structural integrity of the rotor may withstand torque loads as discussed herein. The quantity of holes included in the hat wall, the base portion, or both may vary depending upon the outer diameter of the rotor. The hat wall, the base portion, or both may each include about 4 holes or more, about 5 holes or more, about 7 holes or more, about 8 holes or more, about 9 holes or more, or even about 10 holes or more. The hat wall, the base portion, or both may each include about 30 holes or less, about 27 holes or less, or about 25 holes or less. The hat wall, the base portion, or both may each include between about 4 holes and 25 holes, between about 6 holes and 22 holes, or between about 7 holes and 20 holes. The holes in the base portion and the hat wall may be aligned, staggered, offset, symmetrically located, asymmetrically located, evenly distributed, unevenly distributed, parallel, adjacent, juxtaposed, alternatingly located, or a combination thereof. In one example, the holes in the base portion and the holes in the hat portion may be located across from each other. In another example, the holes in the hat portion may be located across from more than one hole in the base portion. In yet another example, the holes in the hat portion may be spaced apart from the holes in the base portion so that the holes are located across from a solid surface.

The holes in the base portion and the hat wall may be any shape, size, configuration, or a combination thereof so that they improve cooling, reduce the unsprung mass, retain strength characteristics, or a combination thereof of the rotor. The holes in the base portion, the hat wall, or both may be cylindrical, square, cone shaped, oval, elliptical, non-circular, trapezoidal, symmetrical, asymmetrical, elongated, narrow, triangular, rectangular, diamond, a polygon, or a combination thereof. Preferably, the holes in the hat wall, the base portion, or both are not circular. The holes in the base portion, the hat wall, or both may have the same shape, different shapes, or a combination of shapes that may be the same and different. For example, the base portion and hat wall may include an elliptical shaped hole and the base portion may include a trapezoidal shape hole. The holes in the hat wall, the base portion, or both have a length and a width ratio. The length to width ratio of the holes in the hat wall, the base portion, or both may be any ratio so that the holes improve cooling, reduce the unsprung mass, retain strength characteristics, or a combination thereof of the rotor. A ratio of the length to width of each hole may be about 1.1:1 or larger, about 1.2:1 or larger, about 1.5:1 or larger, or about 2:1 or larger. A ratio of the length to width of each hole may be about 5:1 or less, about 4:1 or less, about 3.5:1 or less, or about 3.0:1 or less. The ratio of length to width of each hole may be between about 1:1 and 4.1, preferably between about 1.1:1 and about 3:1, or about 1.1:1 and about 2.5:1. Length as discussed herein may be the largest dimension of the hole and width may be an adjacent (e.g., perpendicular) dimension of the hole. For example, if the hole is oval then the length is the largest diameter (i.e., major axis) and the width is a corresponding adjacent diameter (i.e., minor axis). Each hole may have a length of about 6 mm or more, about 8 mm or more, or about 10 mm or more. The holes may have a length of between about 5 mm and 30 mm, preferably between about 8 mm and 25 mm, and more preferably between about 10 mm and 20 mm. The length of the holes in the hat wall and the length of the holes in the base portion may be equal. The length of the holes in the base portion may be greater than the length of the holes in the hat wall or vice versa. The length of the holes in the base portion may be about 1.2 times or more, about 1.4 times or more, about 1.5 times or more, about 1.6 times or more, or even about 1.8 times or more the length of the holes in the hat wall. The length of the holes in the hat wall may be greater than the length of the holes in the base portion by about 1.1 times or more, about 1.2 times or more, or about 1.3 times or more. The aggregate length of the holes in the base portion may be about 1.2 times or more, about 1.4 times or more, about 1.5 times or more, about 1.6 times or more, or about 1.8 times or more the aggregate length of the holes in the hat wall. For example, the base portion may include twice as many holes as the hat wall and the total length of the holes in the base portion may be 1.6 times longer than the total length of the holes in the hat wall.

The area, shape, configuration, quantity, or a combination thereof of the holes in the hat wall, the base portion, or both may be selected so that the hat wall, the base portion, or both have sufficient strength so that the hat portion, the base portion, or both do not fail (i.e., are not sheared off, damaged, plastically deformed, or a combination thereof) during a brake apply. The rotor including holes may retain sufficient strength so that each respective portion does not fail during a normal brake torque, an emergency brake torque, a continuous braking torque, an intermittent braking torque, or a combination thereof. A region of the base portion, the hat wall, or both including holes may have sufficient strength so that the region may withstand a torque of about 1500 N-m or more, about 2000 N-m or more, about 2200 N-m or more, about 2400 N-m or more, or even about 2500 N-m or more (i.e., at least about 2600 N-m) without failure, fatigue, or both. It is contemplated that the region of the base portion, the hat wall, or both including holes may have sufficient strength to withstand a torque of about 2700 N-m or more, about 3000 N-m or more, about 3500 N-m or more, about 4000 N-m or more, or even 4500 N-M or more. The strength of the base portion, the hat wall, or both may vary based upon size, location, shape, quantity, or a combination thereof of the holes.

The base portion, the hat wall, or both may have a ratio of material between holes to holes. The ratio of material between the holes to holes maybe measured on the annular length of the hat wall, the base portion, or both. The length of the material between the holes to the length of the holes of the hat wall, the base portion, or both may be between about 11 or more, about 1.2:1 or more, or about 1.3:1 or more. Preferably, the length of the material between the holes to the length of the holes is about 1.4:1 or more, about 1.5:1 or more, or about 2:1 or more. The length of material between the holes to the length of the holes may be about 5:1 or less, about 4:1 or less, or about 3.5:1 or less. The length of material between the holes to the length of the holes may be between about 1.2:1 and about 4:1, about 1.3:1 and about 3:1 or about 1.4:1 and about 2.5:1.

The rotor and all of its components may be made of any material that may be used to create friction and can withstand a repeated torque load without failing. The rotor may be made of a single material, an alloy, or both. For example, the rotor may be made of only metal. The rotor may be made of any material that may be formed into a rotor. For example, the rotor may be made of one or more metals so that the rotor has sufficient strength to withstand a torque load as discussed herein as well as provide one or more surfaces that creates friction so that the brake system slows and/or stops the adjoining assembly such as a vehicle. The rotor may be made of steel, aluminum, iron, ceramic, or a mixture thereof. Preferably, the rotor may be made of a gray iron grade G1800 and/or G3000 when measured by SAE J431 or may be a gray iron grade FC200 and/or FC250 when measured by JIS G5501. The rotor may be made of this material using any method and/or process that may form the material into the rotor discussed herein. For example, the rotor may be made using open die forging, closed die forging, casting, green sand molding, no bake molding, resin shell molding, permanent molding, die casting, investment casting, expandable pattern casting, vacuum processing molding, centrifugal molding, counter gravity casting, or a combination thereof. Preferably, the rotor may be made using green sand molding. Some non-limiting examples of green sand molding methods that may be used with the teachings herein are found in U.S. Pat. No. 4,733,712; 6,637,497; or 7,806,161 all of which are incorporated by reference herein. The holes may be formed in the base portion, the hat wall, or both by any method that may form the rotor, the holes, the ribs, a braking surface, or a combination thereof.

The rotor may be formed and the holes subsequently formed in corresponding portions of the rotor discussed herein. One or more holes may be formed in one surface during creation of the rotor and one or more holes may be formed in another surface in a subsequent step. For example, holes may be formed in the base portion during creation of the rotor and one or more holes may be created in the hat wall after the rotor is formed. The holes may be formed using any method that may create holes in a wall and/or portion of the rotor. The holes may be formed by drilling, cutting, torching, milling, electrically burning, electrical discharge machining (EDM), laser cutting, plasma cutting, electron beam cutting, or a combination thereof. Preferably, the holes may be formed during formation of the rotor. For example, holes may be simultaneously formed in the base portion, the hat wall, or both as the rotor is formed. Preferably, all of the holes may be formed when the rotor is molded.

A mold may be used to create a rotor. The mold may include one or more parts so that a molten material may be added to the mold, and a rotor as discussed herein may be created. Preferably, the mold includes two mold cakes (i.e., a first mold cake and a second mold cake). The first mold cake and the second mold cake may be used as vertical molds, horizontal molds, or both. The mold cakes may be vertically oriented, horizontally oriented, or both. The mold cakes may be a drag mold cake and a cope mold cake. Preferably, the mold cakes are a swing mold cake and a ram mold cake. Most preferably, the mold includes a core that is located between the two mold cakes so that the rotor discussed herein is produced. The two mold cakes may be configured, relative to each other, in any manner so that a mold is formed and a rotor is produced from the mold. As discussed herein the mold cakes may be a cope, a drag, a swing mold cake, a ram mold cake, or a combination thereof. The mold may be a flaskless mold. The mold cakes may include two sides. For example, if a mold cake is sandwiched between two adjoining mold cakes a mold will be formed on each side of the mold cake. In another example, each mold cake may have two sides so that molds may be continuously formed by moving a second mold cake adjacent to a first mold cake, and a forward surface (i.e., swing side) the second mold cake completes a mold with the second side (i.e, ram side) of the first mold cake and then when a third mold cake is moved into position the second side (i.e., ram side) of the second mold cake forms half of a new mold with the third mold cake. The mold may be configured so that the resulting rotor includes two smooth braking surfaces with ribs located between the two braking surfaces. The mold cakes and core, or both may be made of sand and binder. The mold cakes, core, or both may be made of any material that may withstand molten material without degrading. The mold cakes, core, or both may be made of any material that may withstand a temperature of about 500° C. or more, about 700° C. or more, about 1100° C. or even 1500° C. or more without losing its shape, form, structural integrity or a combination thereof. The mold cakes, core, or both may be made of any material so that when vigorously vibrated the mold cakes, core, or both break apart so that the contents are released from the mold. The mold, cakes, core, or both may be made of any materials so that when placed in a solvent (e.g., water) the binder dissolves and releases the resulting structure. The mold cakes, core, or both may be formed separately. The mold cakes, core, or both may be formed and then combined forming a mold.

The core may be any shape, size, and configuration so that the core has a structure that will result in a rotor with the features discussed herein. The core may have a configuration so that when placed between the two mold cakes molten material will surround the core and form the rotor discussed herein. The core has a venting portion and a core body. The venting portion includes one or more open areas for forming ribs between the two braking surfaces. Preferably, the venting portion includes the same number of open areas as there are ribs discussed herein. The open areas may be of any size and shape so that one or more corresponding ribs are created between the two braking surfaces. For example, when molten material is added the molten material will surround the core and/or the core portion forming a rotor with ribs between the two friction surfaces. Once the molten material is solidified the core may be removed and the rotor will include the structure described herein. The venting portion may be connected to a core body. The core body may be of any size and shape so that the core body assists in forming one or more holes in the hat wall, the base portion, or both of the rotor. The core body may include one or more projections.

The projections may extend from the core body so that one or more holes are formed in the hat wall, the base portion, or both. Preferably, the core body includes projections on multiple planes. More preferably, the core body may include one or more projections that may form one or more holes in the hat wall and one or more holes in the base portion. The projections may be any size and shape so that the projections when used in a mold create holes in the base portion, the hat wall, or both. The projections may be cylindrical, square, cone shaped, oval, elliptical, non-circular, trapezoidal, symmetrical, asymmetrical, elongated, narrow, triangular, rectangular, diamond, a polygon, or a combination thereof. The projections may be any size and shape so that the projections, the body portion, the open area, or a combination may be created and removed from a core box, a sand casting device, or both. The projections, the body portion, the open areas, or a combination thereof may include a draft angle. The draft angle may be any angle so that the core may be created in a core box, removed from the core box, and used to mold the rotor discussed herein. The draft angle may be about 3 degrees or less, about 2 degrees or less, or about 1 degree or less. The draft angle may be between about 0.5 degrees and 5 degrees, preferably between about 0.5 degrees and 3 degrees, or more preferably between about 1 degree and about 2 degrees. The core body may include projections that extend in different directions. Preferably the core body includes projections that extend in different planes. For example, the projections may extend into and through a corresponding hat wall plane and base portion plane once the rotor is created. The hat wall projections and the base portion projections may extend at an angle relative to each other. The hat wall projections and the base portion projections may form an angle relative to each other. The angle between the hat wall projections and the base portion projections may be any angle so that the resulting rotor has improved air circulation, improved cooling, a reduced unsprung mass, or a combination thereof. The angle between the hat wall projections and the base portion projections may be about 30 degrees or more, about 45 degrees or more, about 60 degrees or more, or about 75 degrees or more. The angle between the hat wall projections and the base portion projections may be about 150 degrees or less, about 135 degrees or less, about 115 degrees or less, or about 105 degrees or less. The angle between the hat wall projections and the base portion projections may be between about 30 degrees and 135 degrees, preferably between about 45 degrees and 125 degrees, more preferably between about 60 degrees and 115 degrees, or most preferably between about 75 degrees and about 105 degrees (i.e., about 90 degrees). The core body includes the same number of projections as the corresponding hat wall, base portion, or both of the resulting rotor discussed herein.

The rotor discussed herein may be created using a process. The process may include a step of forming a mold cakes, a core, or both. The process may include a step of placing the core between to mold cakes forming a complete mold. The process may include adding a molten material to the mold. The process may include adding enough molten material so that the core is substantially surrounded and the mold is filled a sufficient amount to form a rotor. The process may include a step of setting the molten material, cooling the molten material, hardening the molten material, or a combination thereof. The process may include a step of removing the solidified product (i.e., rotor) from the mold. The solidified product may be removed from the mold by vibrating, agitating, dissolving, breaking apart, pulverizing, or a combination thereof so that the rotor is released from the mold. The mold may be placed in a solution bath so that the binder dissolves and the rotor is released.

Figure 1:
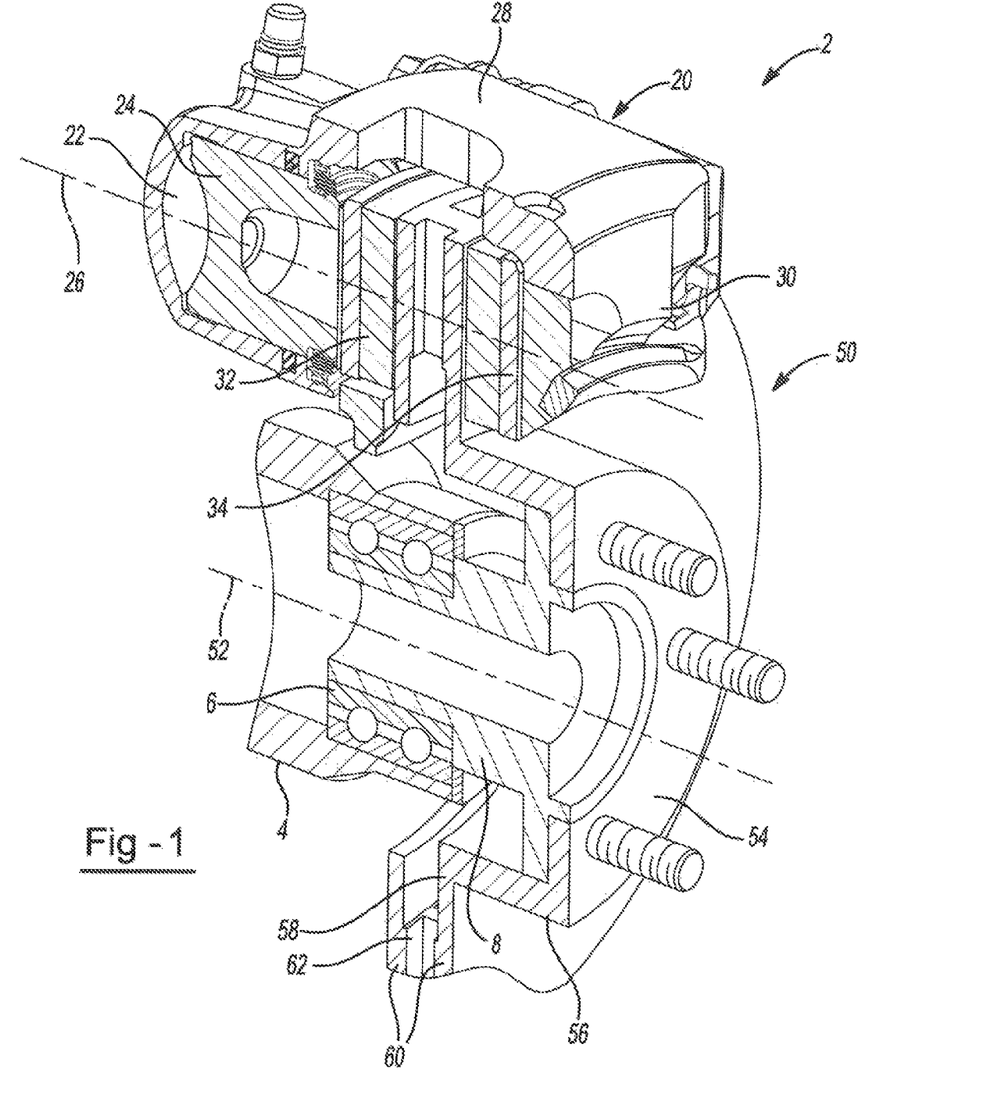
FIG. 1 illustrates a cross-section of corner assembly including the rotor taught herein.

FIG. 1 illustrates a corner module 2. The corner module 2 includes a wheel hub 8 attached to a knuckle 4 via a wheel bearing 6. The corner module 2 further includes a caliper assembly 20 and a rotor 50. The rotor 50 includes a mounting face 54 for attaching the rotor to the wheel hub 8. The corner module 2 is attached to a vehicle (not shown).

The disc brake assembly includes a caliper assembly 20. The caliper assembly 20 has a piston bore 22 that houses a piston 24, and a piston bore axis 26 running through the piston bore 22. The piston bore 22 is attached to a bridge 28 that includes fingers 30, which are opposite the piston bore 22. The caliper assembly includes an inboard brake pad 32 proximate to the piston bore 22 and an outboard brake pad 34 proximate to the fingers 30. The inboard brake pad 32 and the outboard brake pad 34 are separated by a rotor 50. The rotor 50 includes a rotor axis 52. The rotor includes a mounting face 54, a hat wall 56, two opposing braking surfaces 60 and ribs 62 between the braking surfaces.

Figure 2:
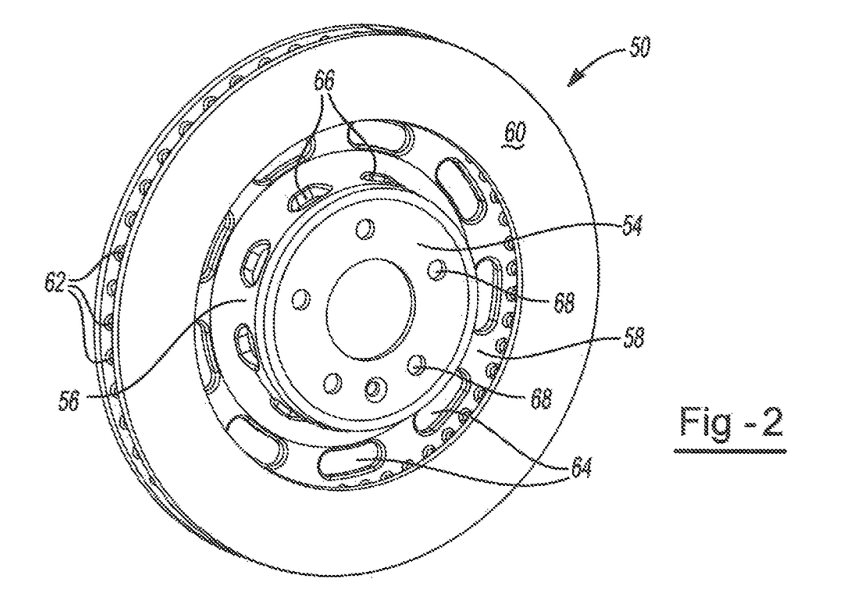
FIG. 2 illustrates an example of a rotor with one possible configuration of the multi-plane holes.

FIG. 2 illustrates one possible configuration of a rotor 50 of the present teachings. The rotor includes holes 66 in the hat wall 56, holes 64 in the base portion 58, and holes 68 in the mounting face 54. As illustrated ribs 62 are included between the braking surfaces 60. The holes 64 in the base portion 58 and the holes 66 in the hat wall 56 are aligned and have a similar oval shape.

Figure 3:
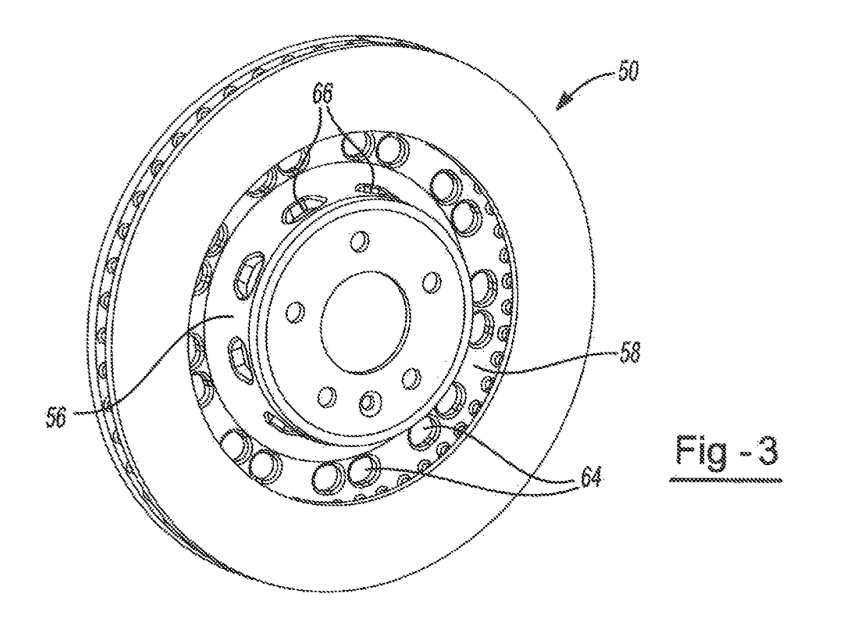
FIG. 3 illustrates an example of a rotor and another configuration of the multi-plane holes.

FIG. 3 illustrates one possible configuration of a rotor 50 of the present teachings. The rotor includes two double holes 64 in the base portion 58 for every one hole 66 in the hat wall 56. The holes 64 in the base portion 58 are configured so that two holes are close together and those two holes are spaced apart from two adjoining holes. The holes 66 in the hat wall 56 are substantially aligned with two adjoining holes 64 in the base portion 58. The holes 64 in the base portion 58 are smaller than the holes 66 in the hat wall 56. The holes 64 and 66 are oval in configuration but the lengths of the holes are decreased compared to the holes illustrated in FIG. 2.

Figure 4:
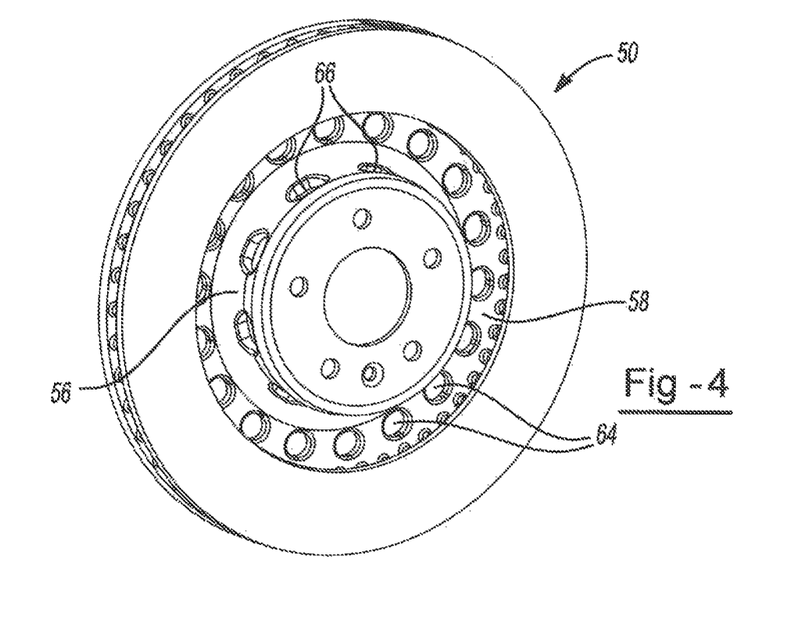
FIG. 4 illustrates another example of a rotor with multi-plane holes.

FIG. 4 illustrates another possible configuration where the holes 64 in the base portion 58 are equally spaced apart. The holes 66 in the hat wall 56 are also equally spaced apart and the holes 66 in the hat wall 56 are aligned with every other hole 64 in the base portion 58. The holes 64 and 66 are oval in configuration but the lengths of the holes are decreased compared to the holes illustrated in FIG. 2.

Figure 5:
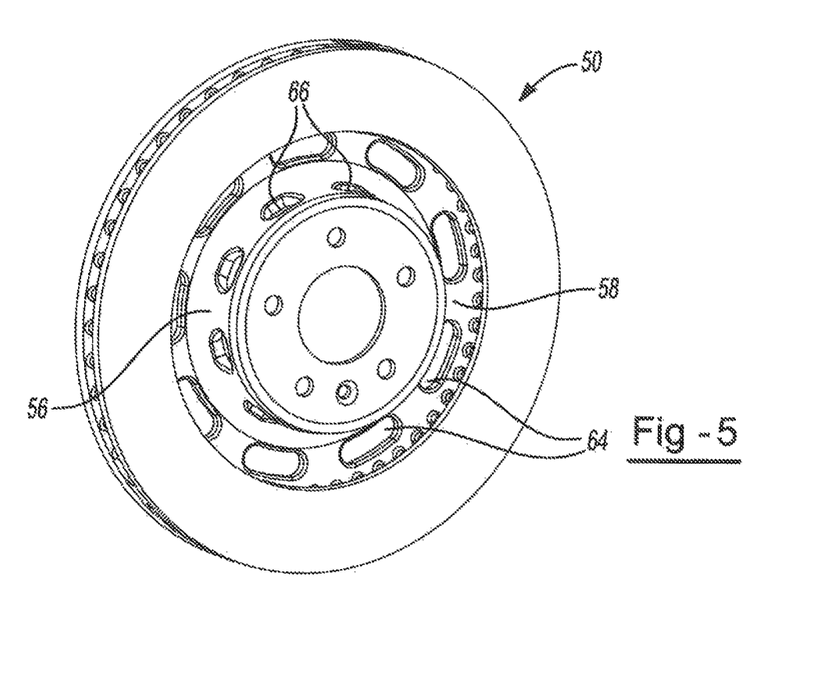
FIG. 5 illustrates yet another example of a rotor with multi-plane holes.

FIG. 5 illustrates another possible configuration of the rotor 50 taught herein. The rotor includes elongated holes 64 in the base portion 58. The lengths of the holes are increased compared to the holes illustrated in FIG. 3. At least a portion of each hole 64 in the base portion 58 aligns with a hole 66 in the hat wall 56. The holes 64 in the base portion have a length that is about between about 1.3 and 1.7 times the length of the holes 66 in the hat wall 56.

Figure 6A:
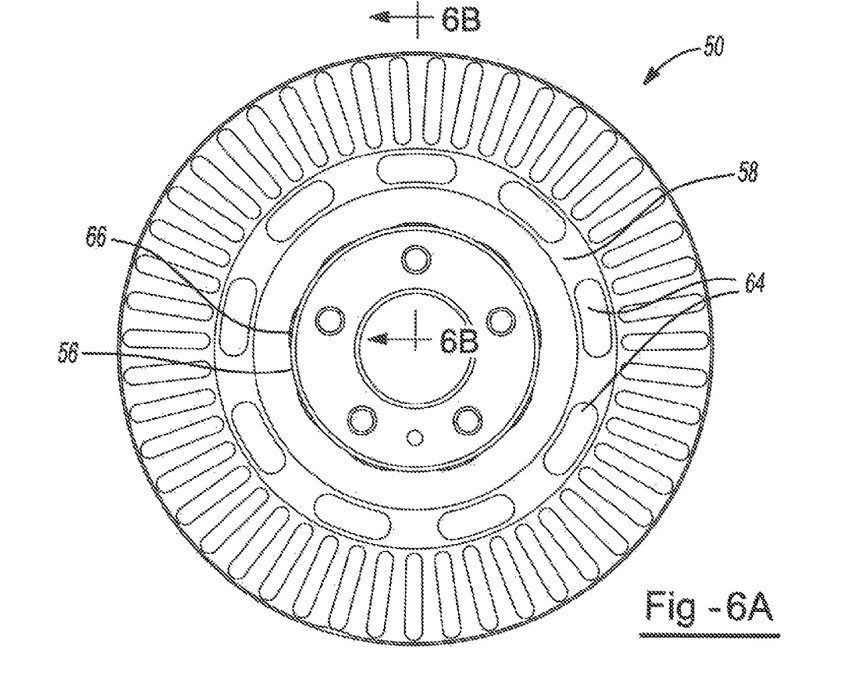
FIG. 6A illustrates a plan view of a rotor with multi plane holes.

FIG. 6A illustrates a plan view of a rotor 50. The holes 66 in the hat wall 56 and the holes 64 in the base portion 58 are shown. As illustrated the upper braking surface is removed in FIG. 6A so that the relationship between the holes 66 in the hat wall 56 and the holes 64 in the base portion 58 are visible.

Figure 6B:
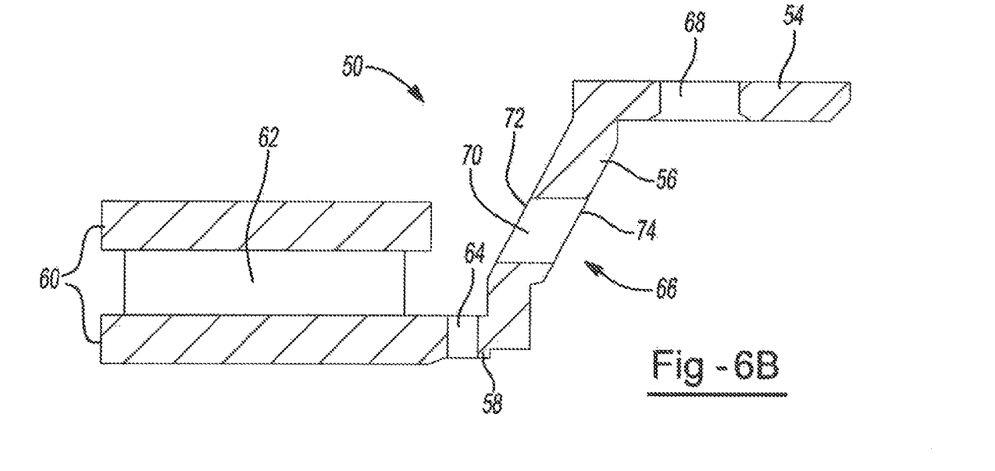
FIG. 6B illustrates a cross section of the rotor of FIG. 6A illustrating the multi-plane holes.

FIG. 6B illustrates a cross-sectional view of the rotor 50 of FIG. 6A with the brake surface 60 added to the top and bottom of the ribs. As illustrated, holes 64, 66, and 68 respectively extend all of the way through, the base portion 58, the hat wall 56, and the mounting face 54. The holes include a hole wall 70 that extends between an upper surface 72 and a lower surface 74 of each respective part of the rotor 50 that includes a hole. As shown the ribs 62 are illustrated between the two opposing braking surfaces 60.

Figure 7A:
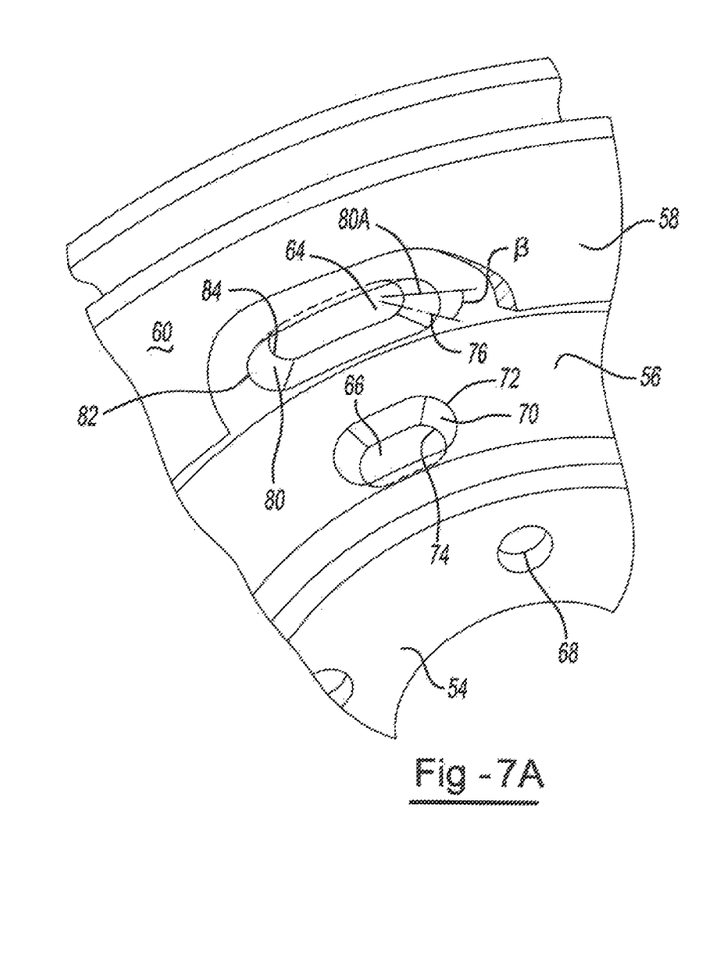
FIGS. 7A-7B illustrate examples of hole configurations.
Figure 7B:
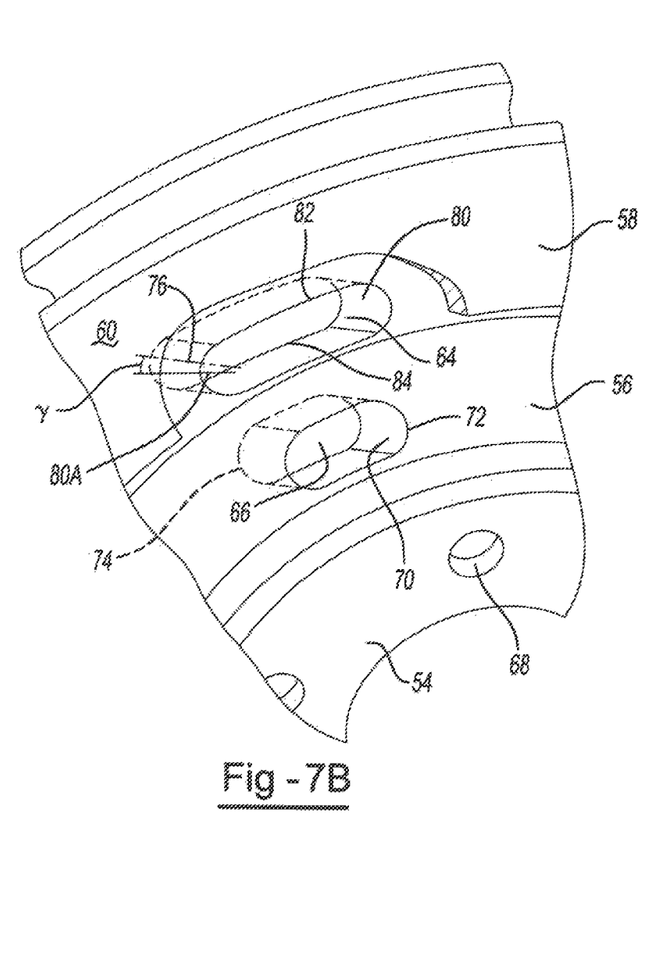

FIG. 7A illustrates one possible configuration of a hole as illustrated. Hole 64 illustrates a line 76 that is normal to the upper surface 82 and the lower surface 84. Hole 64 has a line 80A that corresponds to the angle of the hole wall 80 forming an angle ($\beta$) between line 76 and line 80A. Similarly, hole 66 has a hole wall 70 that forms an angle through the hat wall 56. FIG. 7B illustrates another possible configuration of a hole as illustrated. Hole 64 illustrates a line 76 that is normal to the upper surface 82 and the lower surface 84. Hole 64 has a line 80A that corresponds to the angle of the hole wall 80 forming an angle ($\gamma$) between line 76 and line 80A. Similarly, hole 66 has a hole wall 70 that forms an angle through the hat wall 56.

Figure 8:
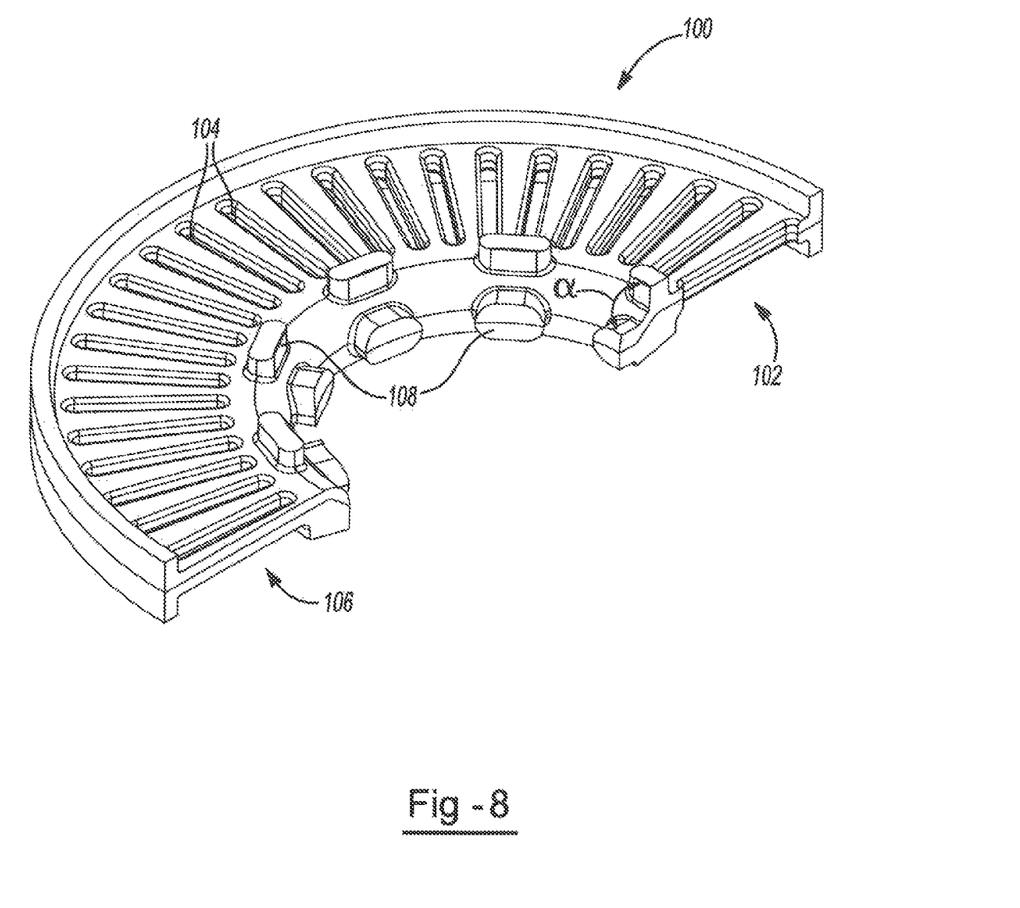
FIG. 8 illustrates an example of a core used in the manufacture of the rotor discussed herein.

FIG. 8 illustrates a core 100. The core includes a venting portion 102 and a core body 106. The venting portion 102 includes a plurality of open areas 104 that are used to create ribs (not shown). The core body 106 includes a plurality of projections 108. The projections 108 are formed at an angle ($\alpha$) so that holes are formed in the hat wall (not shown) and the base portion (not shown).

Figure 9A:
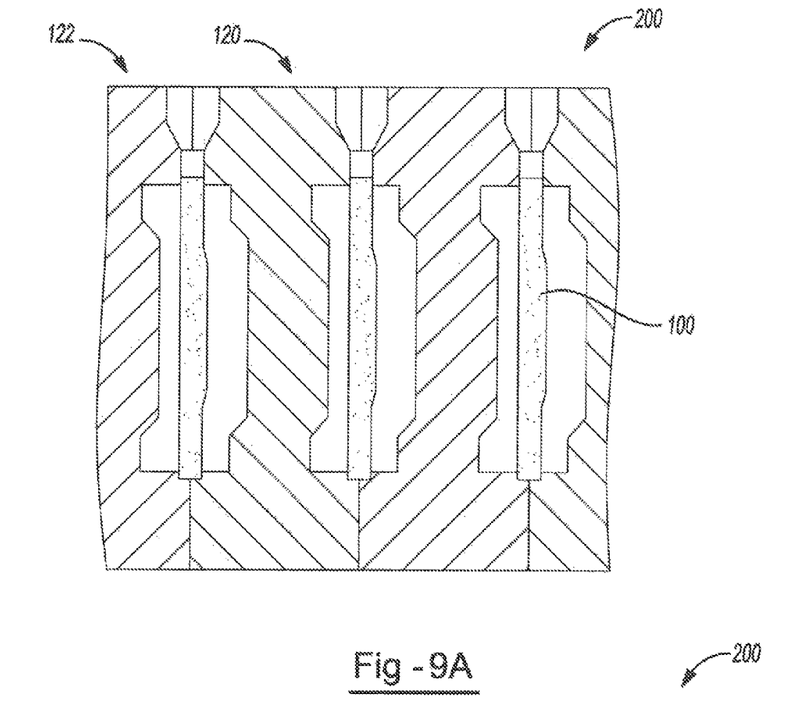
FIGS. 9A-9B illustrate mold configurations including the core of FIG. 9 between two mold cakes for the manufacture of the rotor with multi-plane holes discussed herein.

FIG. 9A illustrates a vertical mold 200. The mold 200 includes a front mold cake 120 (i.e., swing mold) and a rear mold cake 122 (i.e., a ram mold cake). As a new mold cake is added the rear mold cake 120 is transitioned into a rear mold cake 122 so that a mold is formed between the mold cakes. The core 100 is located between the front mold cake 120 and the rear mold, cake 122 so that when molten material is placed in the mold a rotor is created as taught herein.

Figure 9B:
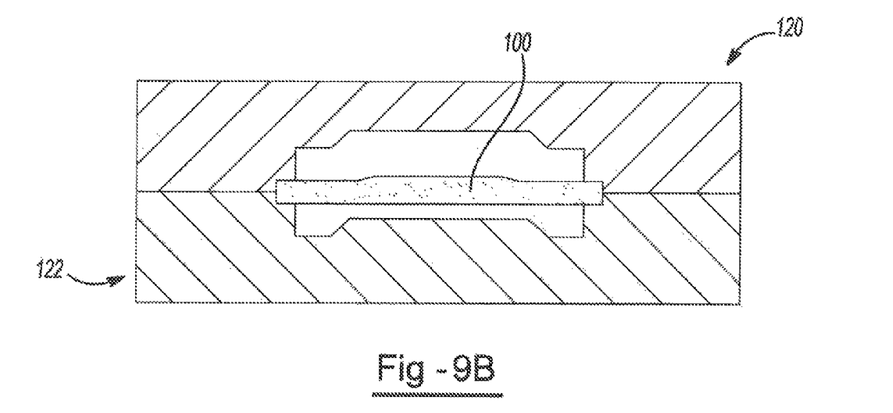

FIG. 9B illustrates a horizontal mold 200. The mold 200 includes a top mold cake 120 (i.e., cope) and a lower mold cake 122 (i.e., drag). The core 100 is located between the upper mold cake 120 and the lower mold cake 122 so that when molten material is placed in the mold a rotor is created as taught herein.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The term "consisting essentially" to describe a combination shall include the elements, ingredients, components or steps identified, and such other elements, ingredients, components or steps that do not materially affect the basic and novel characteristics of the combination.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A method of forming a rotor comprising:
   forming a mold by:
      forming a first mold cake;
      forming a second mold cake;
      forming a core that fits between the first mold cake and the second mold cake; and
      locating the core between the first mold cake and the second mold cake;
   wherein the core includes:
      a core body;
      one or more projections extending from the core body for forming one or more holes in a base portion of the rotor; and
      one or more projections extending from the core body for forming one or more holes in a hat wall of the rotor;
   wherein the one or more projections for forming the one or more holes in the base portion and the one or more projections for forming the one or more holes in the hat wall are located at an angle relative to each other;
   wherein the one or more holes in the base portion and the one or more holes in the hat wall are in an aligned relationship;
   wherein the rotor comprises a two-sided braking surface, the base portion attaches the two-sided braking surface to the hat wall, and the base portion is located in a plane that is generally parallel to at least one of the sides of the two-sided braking surface.

2. The method of claim 1, wherein the one or more projections for forming the one or more holes in the base portion form an angle of between about 75 degrees and about 105 degrees with the one or more projections for forming the one or more holes in the hat wall.

3. The method of claim 1, wherein the core includes one or more open areas for forming ribs between the two-sided braking surface so that vent surfaces remain smooth.

4. The method of claim 1, wherein the first mold cake and the second mold cake are made of sand and binder.

5. The method of claim 1, wherein the method comprises:
   pouring a molten metal into the mold so that the core is substantially surrounded and the first mold cake and the second mold cake are filled to form the rotor, and
      vibrating the mold so that the first mold cake, the second mold cake, the core, or a combination thereof are destroyed and/or broken apart so that sand is removed and the rotor is released from the mold.

6. The method of claim 1, wherein the one or more holes in the base portion are oval shaped, and the one or more holes in the hat wall are oval shaped, and
   wherein the one or more projections that form the one or more holes in the base portion and the one or more projections that form the one or more holes in the hat wall have a draft angle between about 0.5 degrees and about 5 degrees.

7. The method of claim 6, wherein the one or more holes in the base portion include a length that is larger than a corresponding length of the one or more holes in the hat wall.

8. The method of claim 6, wherein a ratio of material between the one or more holes in the base portion and a length of the one or more holes in the base portion is between about 1:1 and about 1.5:1.

9. The method of claim 6, wherein a ratio of material between the one or more holes in the hat wall and a length of the one or more holes in the hat wall is between about 1:1 and about 1.5:1.

10. The method of claim 1, wherein the one or more holes in the base portion are circular shaped, and the one or more holes in the hat wall are oval shaped.

11. The method of claim 10, wherein the one or more holes in the base portion comprise one or more pairs of holes, and a center area located between holes in each of the one or more pairs of holes is aligned with a hole of the one or more holes in the hat wall.

12. The method of claim 10, wherein the one or more holes in the bat wall are aligned with every other hole of the one or more holes in the base portion.

13. The method of claim 1, wherein the one or more holes in the base portion and the one or more holes in the hat wall have a length and a width, and one or more of the one or more holes in the base portion and one or more of the one or more holes in the hat wall have a length to width ratio between about 1.1:1 and about 2.5:1.

14. The method of claim 1, wherein the base portion is oriented between about 85 degrees and about 95 degrees from the hat wall.

15. The method of claim 14, wherein the one or more holes in the base portion are located in a base plane and the one or more holes in the hat wall are located in a hat plane and the base plane and the hat plane are at about a 90 degree angle relative to each other.

16. A method of forming a rotor comprising:
   forming a mold by:
      forming a first mold cake;
      forming a second mold cake;
      forming a core that fits between the first mold cake and the second mold cake; and
      locating the core between the first mold cake and the second mold cake;
   wherein the core includes:
      a core body;
      one or more projections extending from the core body for forming one or more holes in a base portion of the rotor; and
      one or more projections extending from the core body for forming one or more holes in a hat wall of the rotor, the hat wall extending between and connecting the base portion and a mounting face of the rotor;
   wherein the one or more projections for forming the one or more holes in the base portion and the one or more projections for forming the one or more holes in the hat wall are located at an angle relative to each other,
   wherein the base portion is oriented between about 85 degrees and 90 degrees from the hat wall, and
   wherein the rotor comprises a two-sided braking surface, the base portion attaches the two-sided braking surface to the hat wall, and the base portion is located in a plane that is approximately parallel to at least one of the sides of the two-sided braking surface.

17. The method of claim 16, wherein the one or more holes in the base portion are oval shaped, and wherein the one or more holes in the base portion include a length that is larger than a corresponding length of the one or more holes in the hat wall.

18. The method of claim 17, wherein the one or more holes in the base portion and the one or more holes in the hat wall have a length and a width and a length to width ratio of between about 1.1:1 and about 2.5:1.

19. The method of claim 16, wherein the one or more holes in the base portion are circumferentially offset relative to the one or more holes in the hat wall.

20. The method of claim 16, wherein the one or more holes in the base portion are located in a base plane and the one or more holes in the hat wall are located in a hat plane and the base plane and the hat plane are at about a 90 degree angle relative to each other, and
wherein a hole wall extending between a top surface and a bottom surface of the base portion, the hat wall, or both extends at an angle of between about 0.5 degrees and about 5 degrees from a line normal to the top surface and the bottom surface of the base portion, the hat wall, or both.

\* \* \* \* \*

UNITED STATES PATENT AND TRADEMARK OFFICE
CERTIFICATE OF CORRECTION

PATENT NO. : 9,850,969 B2  
APPLICATION NO. : 14/734593  
DATED : December 26, 2017  
INVENTOR(S) : Eric J. Barber and Brian C. Nadeau It is certified that error appears in the above-identified patent and that said Letters Patent is hereby corrected as shown below:

On the Title Page

Item (57) Abstract, Line 9, delete "bat" and replace with --hat--

In the Claims

Column 14, Line 22, Claim 12, delete "bat" and replace with --hat--

Signed and Sealed this  
Twenty-ninth Day of May, 2018

Andrei Iancu  
*Director of the United States Patent and Trademark Office*